(12) United States Patent
Molander et al.

(10) Patent No.: US 8,843,469 B2
(45) Date of Patent: Sep. 23, 2014

(54) FACETED AND SELECTABLE TABS WITHIN EPHEMERAL SEARCH RESULTS

(75) Inventors: Mark Molander, Research Triangle Park, NC (US); Alejandro M. Ortiz, Rochester, MN (US); Todd M. Eischeid, Research Triangle Park, NC (US); Karen McWaters, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 13/198,377

(22) Filed: Aug. 4, 2011

(65) Prior Publication Data

US 2013/0036132 A1     Feb. 7, 2013

(51) Int. Cl.
G06G 7/06      (2006.01)
G06F 17/30     (2006.01)
G06F 3/0481    (2013.01)

(52) U.S. Cl.
CPC ........ G06F 17/30554 (2013.01); *G06F 3/0481* (2013.01)
USPC ........................... 707/708; 707/769; 715/764

(58) Field of Classification Search
CPC .. G06F 17/30554; G06F 17/30; G06F 3/0481
USPC ........... 707/999.003, 708, 769, 771; 715/825, 715/764
See application file for complete search history.

(56) References Cited

U.S. PATENT DOCUMENTS

| | | | |
|---|---|---|---|
| 5,924,090 A | 7/1999 | Krellenstein | |
| 6,341,280 B1 | 1/2002 | Glass et al. | |
| 7,487,144 B2 | 2/2009 | Shakib et al. | |
| 7,676,517 B2 | 3/2010 | Hurst-Hiller et al. | |
| 7,698,344 B2 | 4/2010 | Sareen et al. | |
| 7,801,896 B2 | 9/2010 | Szabo | |
| 2007/0180020 A1 | 8/2007 | Woods | |
| 2008/0005686 A1* | 1/2008 | Singh | 715/764 |
| 2008/0065237 A1* | 3/2008 | Long | 700/3 |
| 2009/0013285 A1* | 1/2009 | Blyth et al. | 715/816 |
| 2009/0240672 A1* | 9/2009 | Costello | 707/4 |
| 2009/0327947 A1* | 12/2009 | Schreiner et al. | 715/777 |
| 2010/0049766 A1 | 2/2010 | Sweeney et al. | |
| 2011/0055759 A1 | 3/2011 | Robert et al. | |
| 2012/0150844 A1* | 6/2012 | Lindahl et al. | 707/722 |
| 2012/0167010 A1* | 6/2012 | Campbell et al. | 715/825 |

* cited by examiner

*Primary Examiner* — Bruce Moser
(74) *Attorney, Agent, or Firm* — Suiter Swantz pc llo (57) ABSTRACT

The present disclosure describes systems and method for displaying search results. Operations of the system and method may include, but are not limited to: receiving a selection associated with a tab group; receiving a search string; and displaying one or more records according to the selection of the tab group and the search string.

20 Claims, 13 Drawing Sheets

FIG. 13C

# FACETED AND SELECTABLE TABS WITHIN EPHEMERAL SEARCH RESULTS

BACKGROUND

Quick inline search tools have become very popular in recent years. They function by instantly refreshing the displayed search results after each change in the user-entered search query. After a user enters a few characters, the search results list is quickly narrowed to a workable size. The user benefits by finding what is being searched for more quickly than by using previous methods.

However even after the user has provided his entire search query, the desired result may not be readily visible in the displayed list.

SUMMARY

The present disclosure describes systems and methods for providing surfaced and single-click accessible facet groupings for inline search results. Operations of the system and method may include, but are not limited to: receiving a selection associated with a tab group; receiving a search string; and displaying one or more records according to the selection of the tab group and the search string.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
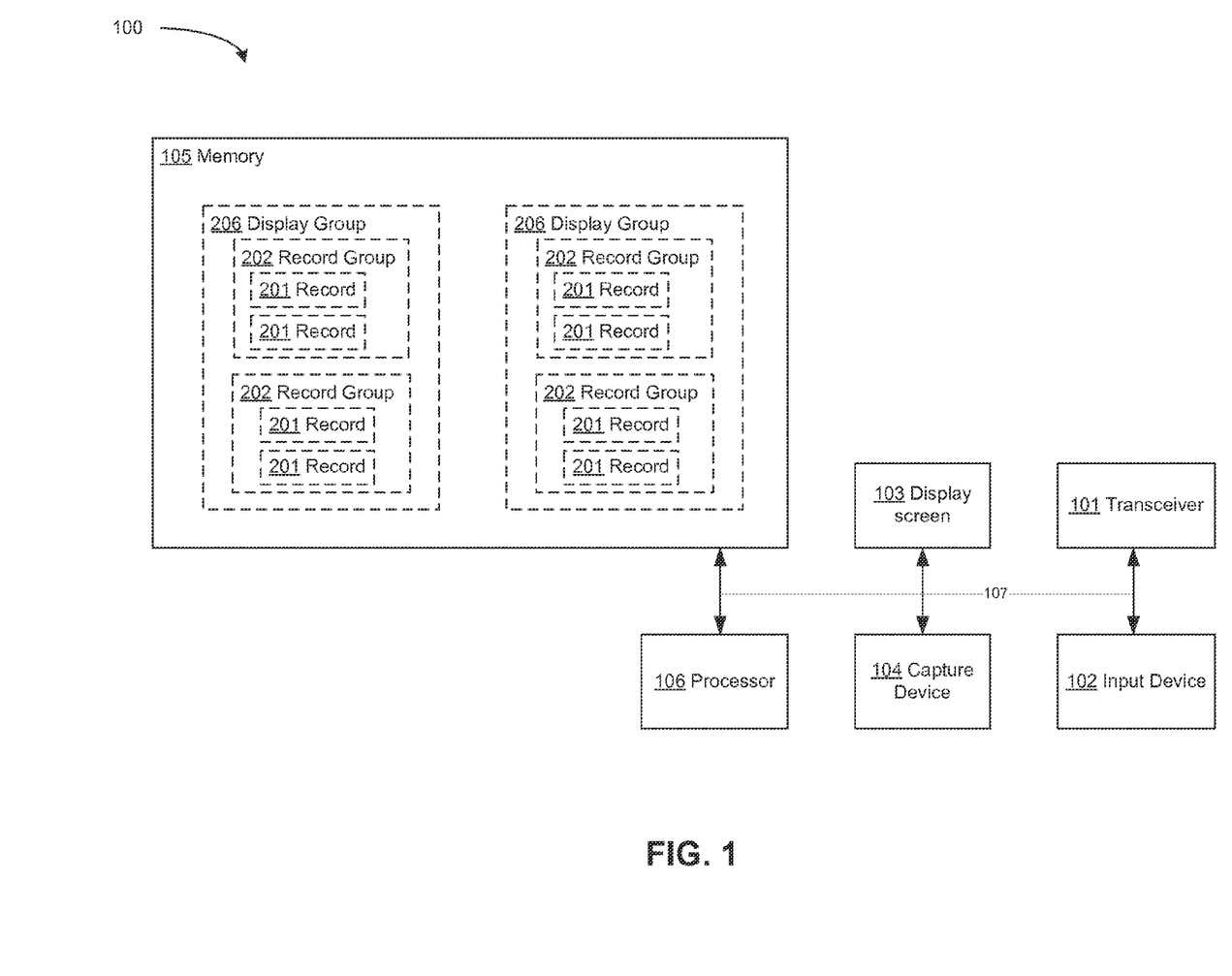
FIG. 1 shows a system for search and display of database records.

FIG. 1 depicts an exemplary system 100 for search and display of database records 201 and/or category groups 202.

The system 100 may be a computing device (e.g. a touch-screen enabled tablet computer, smart phone, desktop computer, and the like).

The system 100 may include a transceiver 101, one or more input devices 102, a display screen 103 (e.g. a touch-sensitive display screen), one or more capture devices 104, a memory 105, and a processor 106 coupled to one another via a bus 107 (e.g., a wired and/or wireless bus).

The transceiver 101 may be any system and/or device capable of communicating (e.g., transmitting and receiving data and/or signals) with one or more external devices. The transceiver 101 may operatively connect the system 100 to external devices via a wireless (e.g. Wi-Fi, Bluetooth, cellular data connections, etc.) or wired (Ethernet, etc.) connection.

The one or more input devices 102 may be any system and/or device capable of receiving input from a user. Examples of input devices 102 include, but are not limited to, a mouse, a key board, a microphone, a selection button, and the like. In various embodiments, each input device 102 is in communication with display screen 103. In other embodiments, the display screen 103 is itself, an input device 102 as in the case of a touch-sensitive display screen.

In various embodiments, the display screen 103 may be configured to display one or more database records or groupings thereof.

The capture devices 104 may be any system and/or device capable of capturing environmental inputs (e.g., visual inputs, audio inputs, tactile inputs, etc.). Examples of capture devices 104 include, but are not limited to, a camera, a microphone, a global positioning system (GPS), a gyroscope, a plurality of accelerometers and the like.

The memory 105 may be any system and/or device capable of storing data. In one embodiment, memory 105 stores computer code that, when executed by processor 106, causes processor 106 to perform a method for searching and displaying one or more database records of groupings thereof stored in the memory 105.

As shown in FIGS. 2-13C, the system 100 may be configured (e.g. running software and/or firmware stored in memory 105; employing application specific circuitry, etc.) to display a user interface (e.g. display by the display screen 103). The system 100 may search and display database records 201 and/or category groups 202 according to one or more user inputs received by the input device 102.

Figure 2:
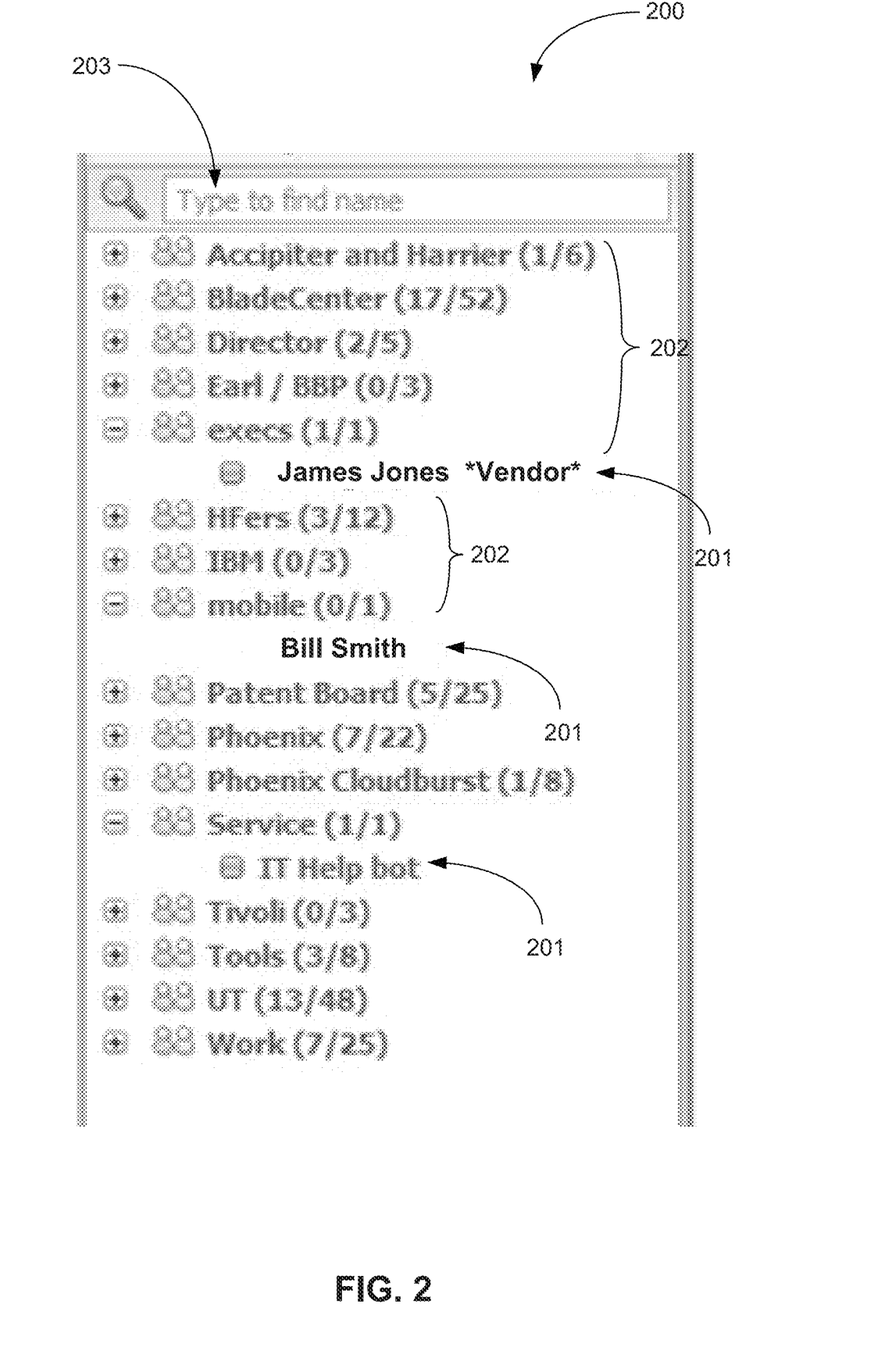
FIG. 2 shows a search bar and a record list populated with multiple records.
Figure 3:
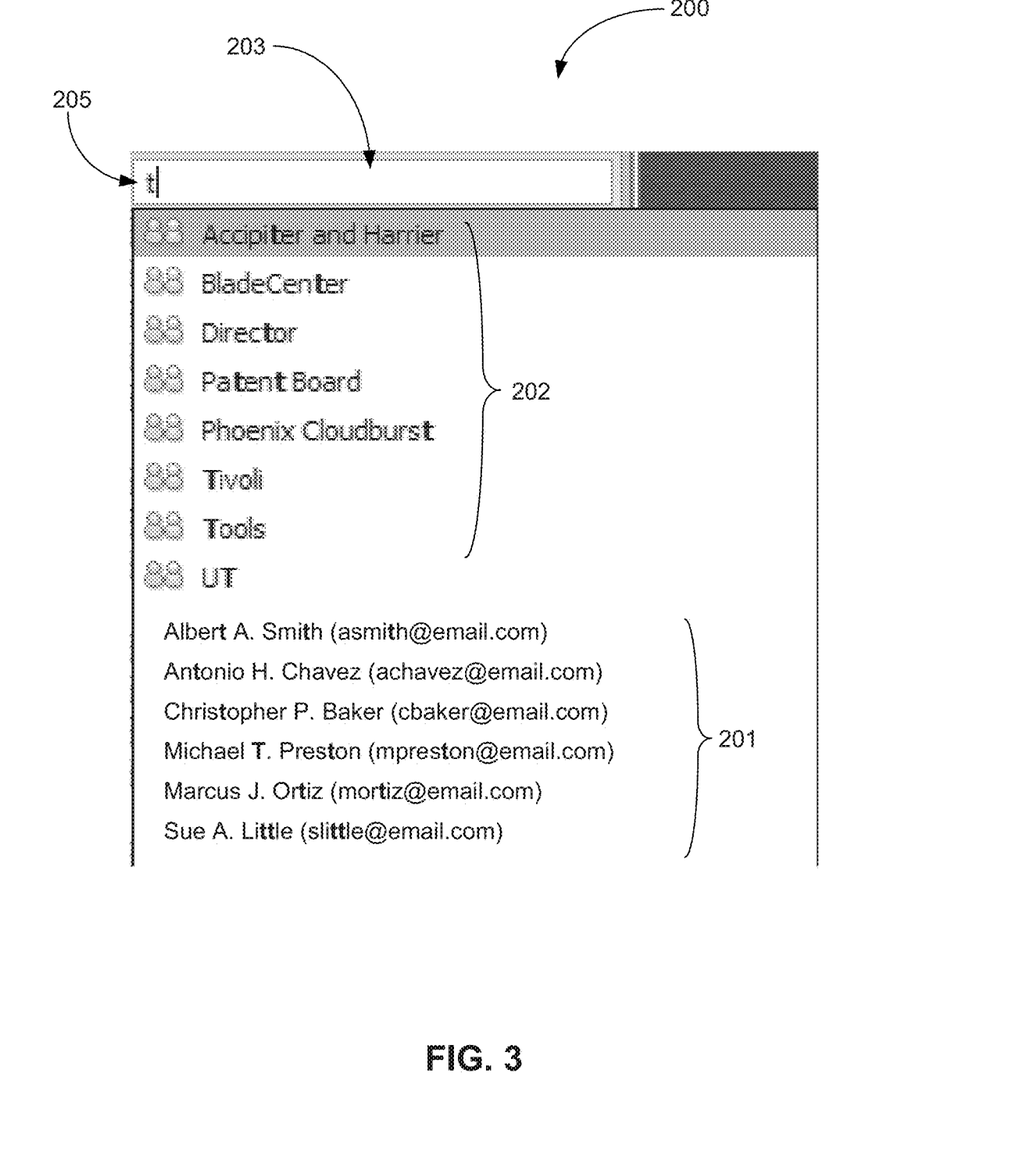
FIG. 3 shows a search string entered into a search bar and resulting ephemeral search results.
Figure 4:
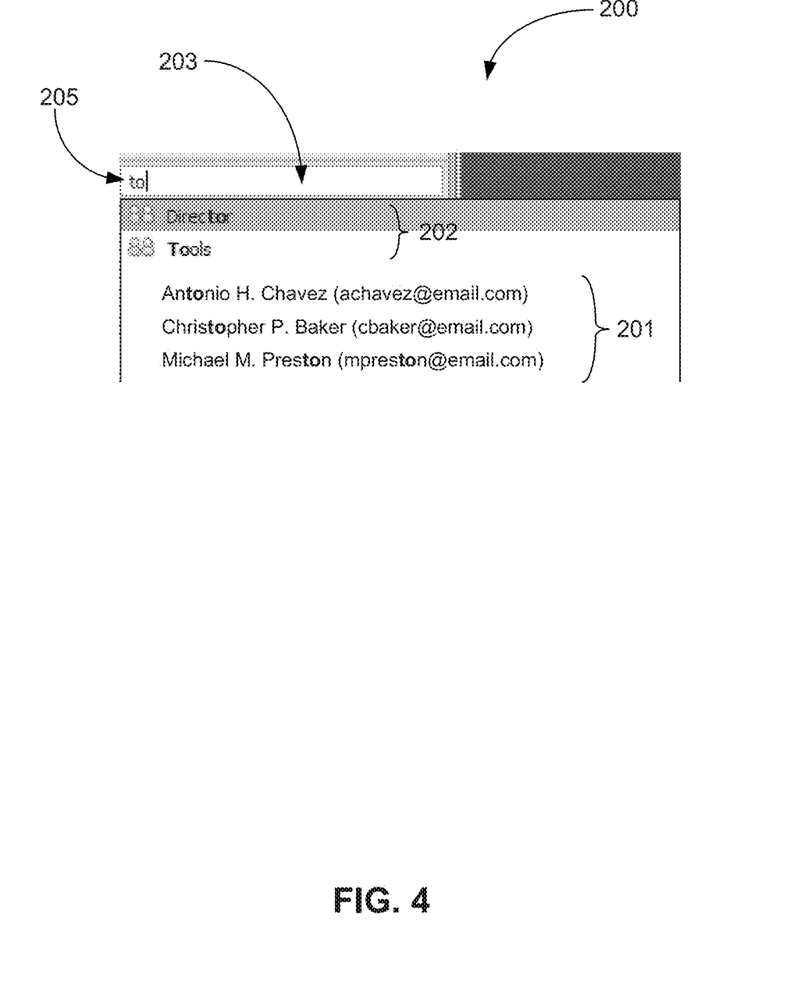
FIG. 4 shows a search string entered into a search bar and resulting ephemeral search results.
Figure 5:
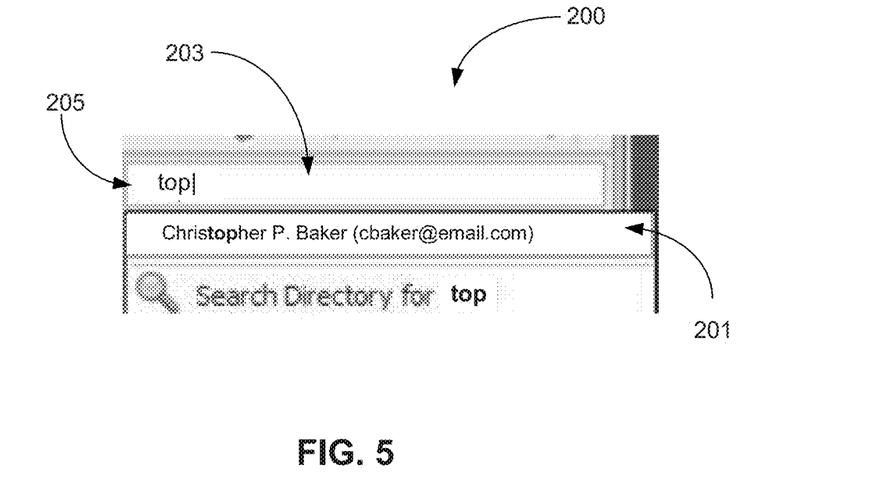
FIG. 5 shows a search string entered into a search bar and resulting ephemeral search results.

In FIG. 2, a user interface displaying a hierarchical list 200 of records 201 is shown. The list 200 may include various types of records 201 (e.g. contact information for an individual or entity) and/or one or more category groups 202 including one or more related records 201 (e.g. contact groups). A search box 203 is provided for ephemeral inline searching of the list 200. FIG. 3 shows a search result list 204 (e.g. a pop-up type list) that is displayed upon receipt of a user input. For example, as shown in FIG. 3, a user has entered a search string 205 "t" into the search box 203. Note that the search may be dynamic in nature in that a user may not be required to press an enter key for search results to be displayed or updated. Rather, the search result list 204 will be refreshed each time a user adds or removes characters from the search box 203. In this instance, the search result list 204 displays records 201 that contain the search string "t" or category groups 202 whose titles contain the search string 205 "t". Further, as shown in FIG. 4, when a user keys in the search string 205 "to", the search result list 204 of is further refined to display records 201 or category groups 202 that contain the string "to." Still further, as shown in FIG. 5, when the user enters the string "top", only one record 201 is displayed. In other instances, however, the user may enter the entire search string and a desired record 201 or category group 202 may still be obscured among many undesired records 201.

Figure 6:
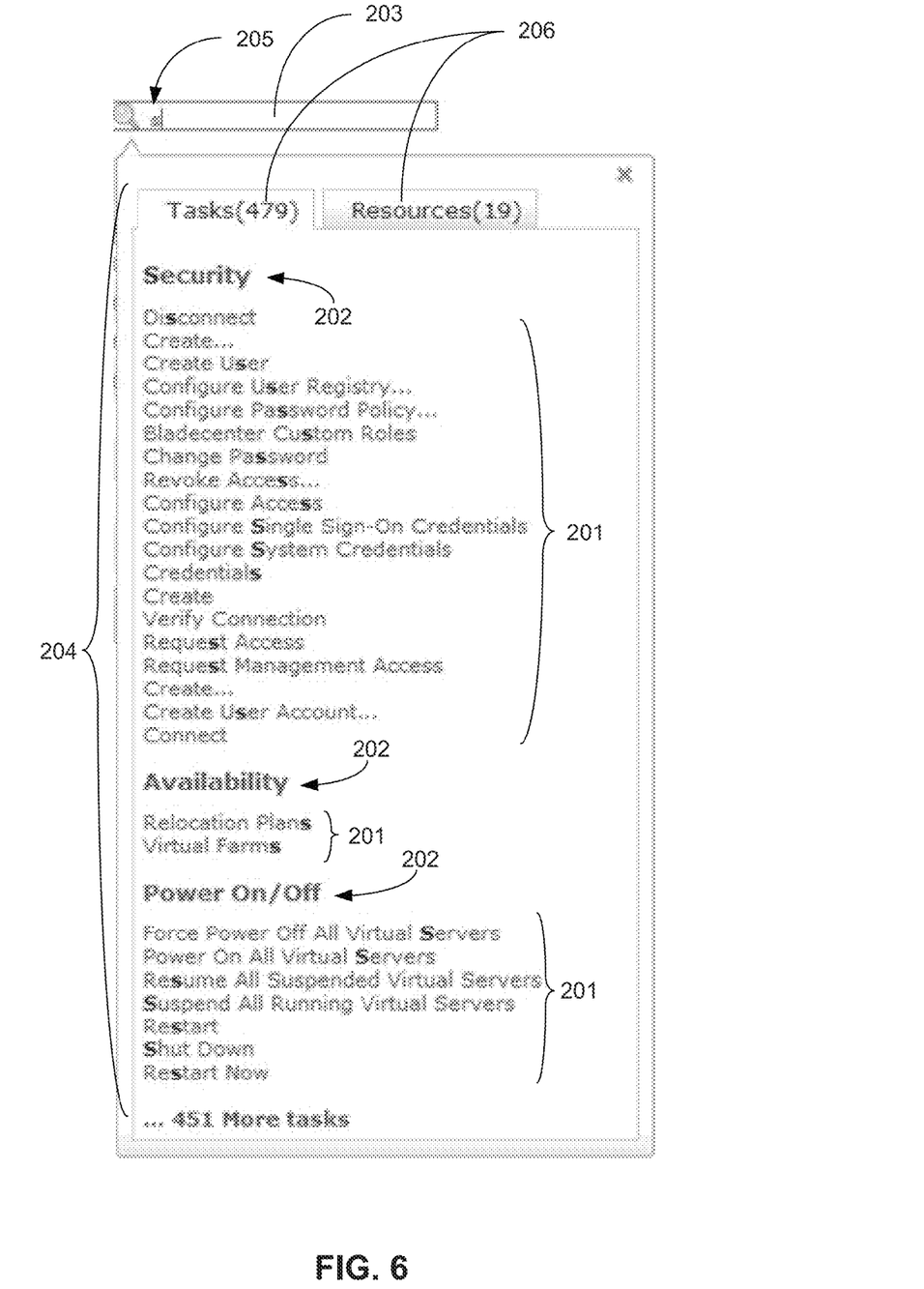
FIG. 6 shows a search string entered into a search bar and resulting ephemeral search results.

Graphical representations of an embodiment of the invention are shown in FIGS. 6-13C. Referring to FIG. 6, a search string 205 may be received through input device 102 in response to a user input and displayed in the search box 203. Note that the search may be dynamic in nature in that a user may not be required to press an enter key for search results to be displayed or updated. Rather, the search result list 204 will be refreshed each time a user adds or removes characters from the search box 203. Search results may be updated after each change to the search string 205. Each record 201 may be assigned to at least one category group 202 and each category group 202 may be assigned to at least one of N tab groups 206. The tab groups 206 may be defined by factory settings or further defined by an end user. For example in FIG. 6, N=2 and each category group 202 may be assigned exclusively to either the "Tasks" tab group 206 or the "Resources" tab group 206. Each tab group 206 may be graphically represented in a search result list 204 as a user selectable tab. A selection of a tab group 206 may be received through input device 102 (e.g. a user may select a tab group 206 by clicking on its corresponding tab). The search result list 204 may display only records 201 where: 1) the record 201 contains the search string 205 and the record 201 belongs to a category group 202 that belongs to the selected tab group 206; or 2) the record 201 belongs to a category group 202 whose title contains the search string 205 and said category group 202 belongs to the selected tab group 206.

For example, in FIG. 6 the user may be searching for a list of all servers. It may be the case that "Server" may be a category group 202. In FIG. 6, the tab representing the "Tasks" tab group 206 has been selected by a user and the user has entered "s" as a search string. In response to such inputs, various types of records 201 may be displayed. A first type of displayed records 201 contain the search string "s" and belong to a category group 202 that belongs to the selected tab group 206 (e.g. "Tasks"). An example of such a record 201 is "Relocation Plans" which is the first record 201 listed in the search result list 204 under the category group 202 "Availability." A second type of displayed record 201 belongs to a category group 202 whose title contains the string "s" and said category group 202 belongs to the selected tab group 206. An example of such a record 201 is "Create . . . " which is the second record 201 listed in the search result list 204 under the category group 202 "Security". It may the case that a displayed record 201 both contains the search string "s" and belongs to a category group 202 whose title contains the string "s" and said category group 202 belongs to the selected tab group 206. An example of such a record 201 is "Disconnect" listed under the category group 202 "Security." If more records 201 meet the criteria than can be displayed on the search result list 204, some records 201 that satisfy search criteria may be hidden (e.g. "451 More tasks").

The tab corresponding to a selected tab group 206 may appear in the foreground whereas tabs corresponding to unselected tab groups 206 may appear in the background. For example in FIG. 6, tab group 206 "Tasks" has been selected and its tab appears in the foreground as selected while tab group 206 "Resources" is not selected and its tab appears in the background as unselected.

Figure 7:
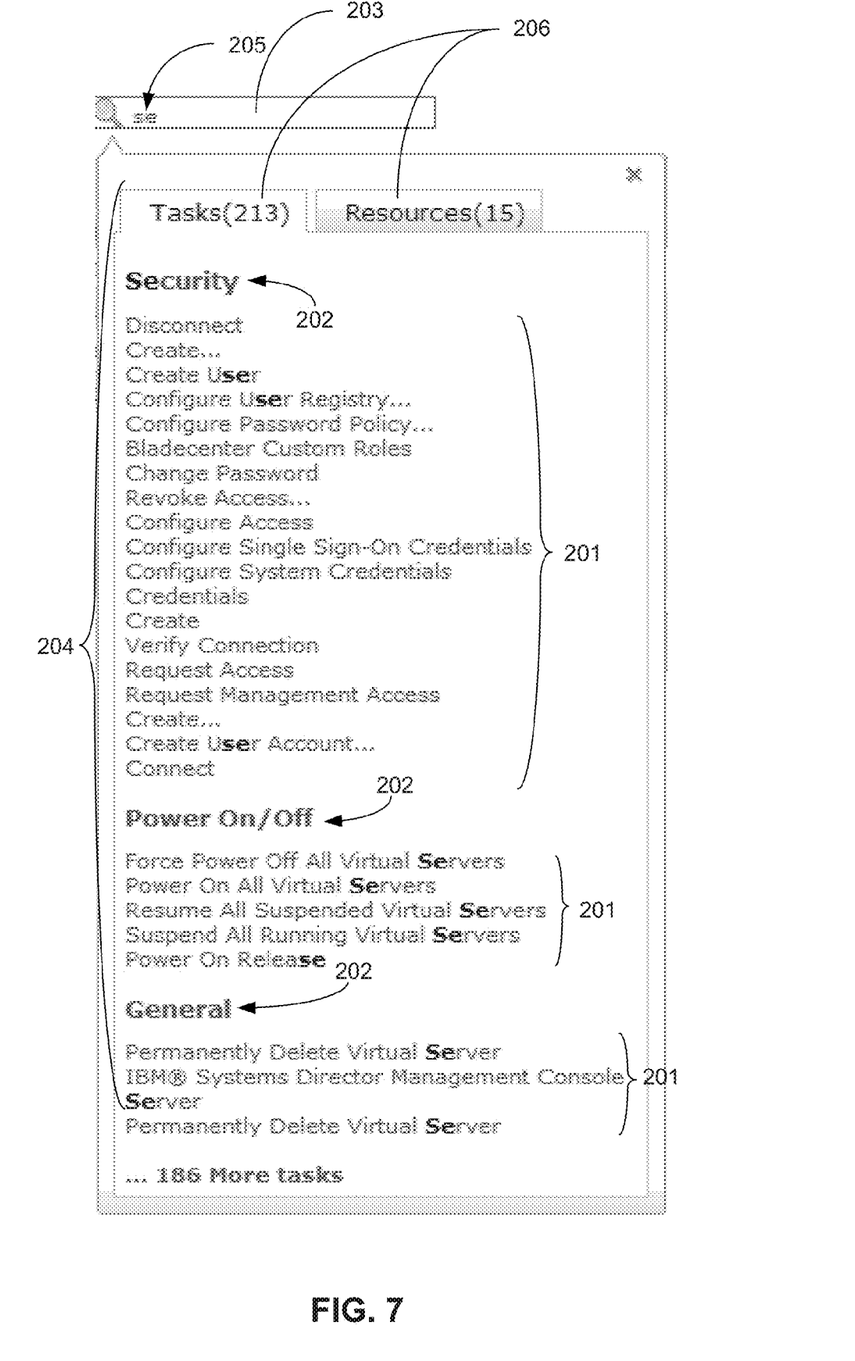
FIG. 7 shows a search string entered into a search bar and resulting ephemeral search results.

The number of displayed search results may be reduced when a longer search string 205 is entered by a user. Referring to FIG. 7, a user has entered the characters "se" as a search string 205. As can be seen from comparing FIG. 7 to FIG. 6, fewer records 201 are displayed in search result list 204 because fewer records 201 satisfy at least one of the two display criteria (e.g. the record 201 contains the search string "se" and belongs to a category group 202 that belongs to the selected tab group 206; and/or belongs to a category group 202 whose title contains the string "se" and said category group 202 belongs to the selected tab group 206).

Figure 8:
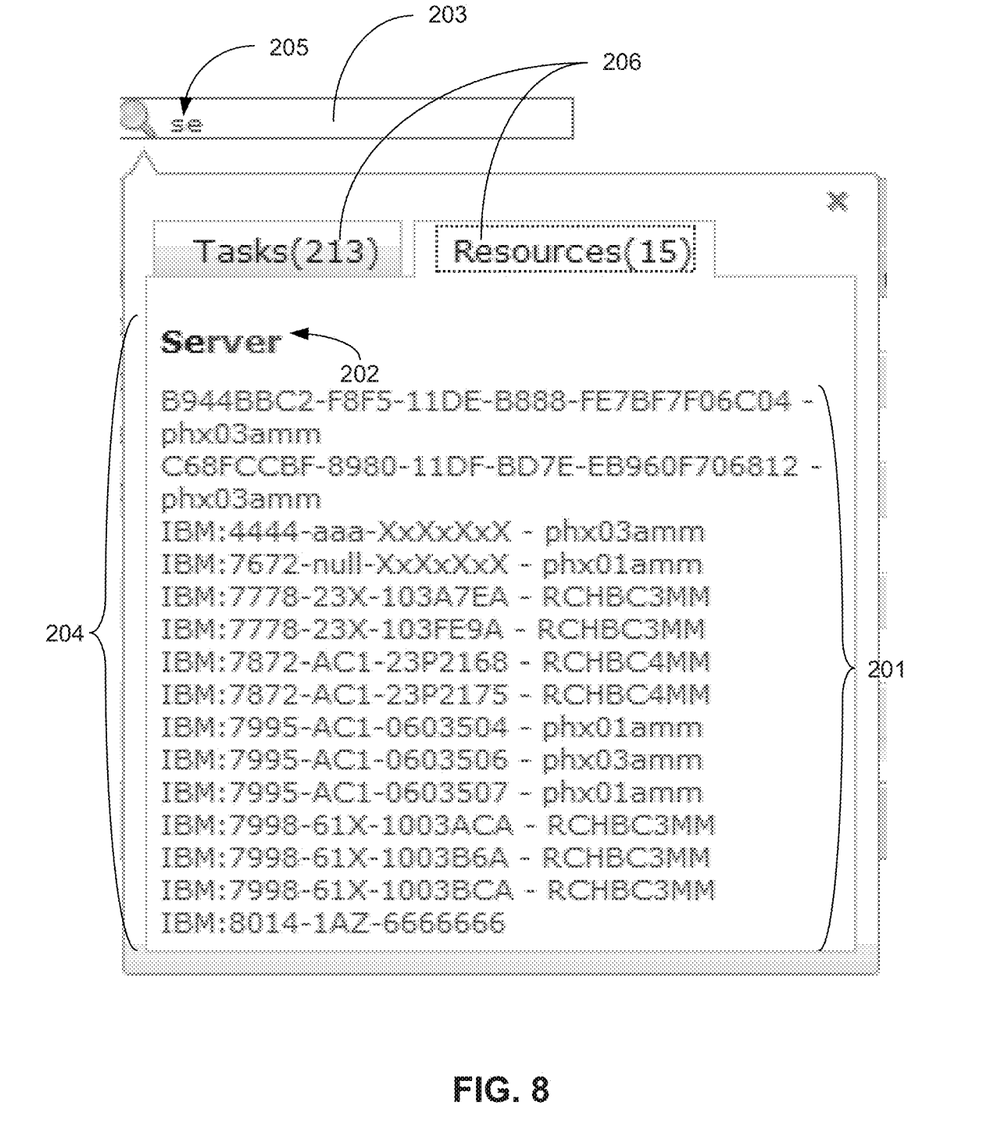
FIG. 8 shows a search string entered into a search bar and resulting ephemeral search results.

In FIG. 8, the user has selected the "Resources" tab group 206. This changes the criteria that records 201 must satisfy in order to be displayed in search result list 204, as explained above. For example, the user selecting the "Resources" tab group 206 and entering the search string 205 "se" may have caused a list of all "Servers" to be displayed in the search result list 204.

Figure 9:
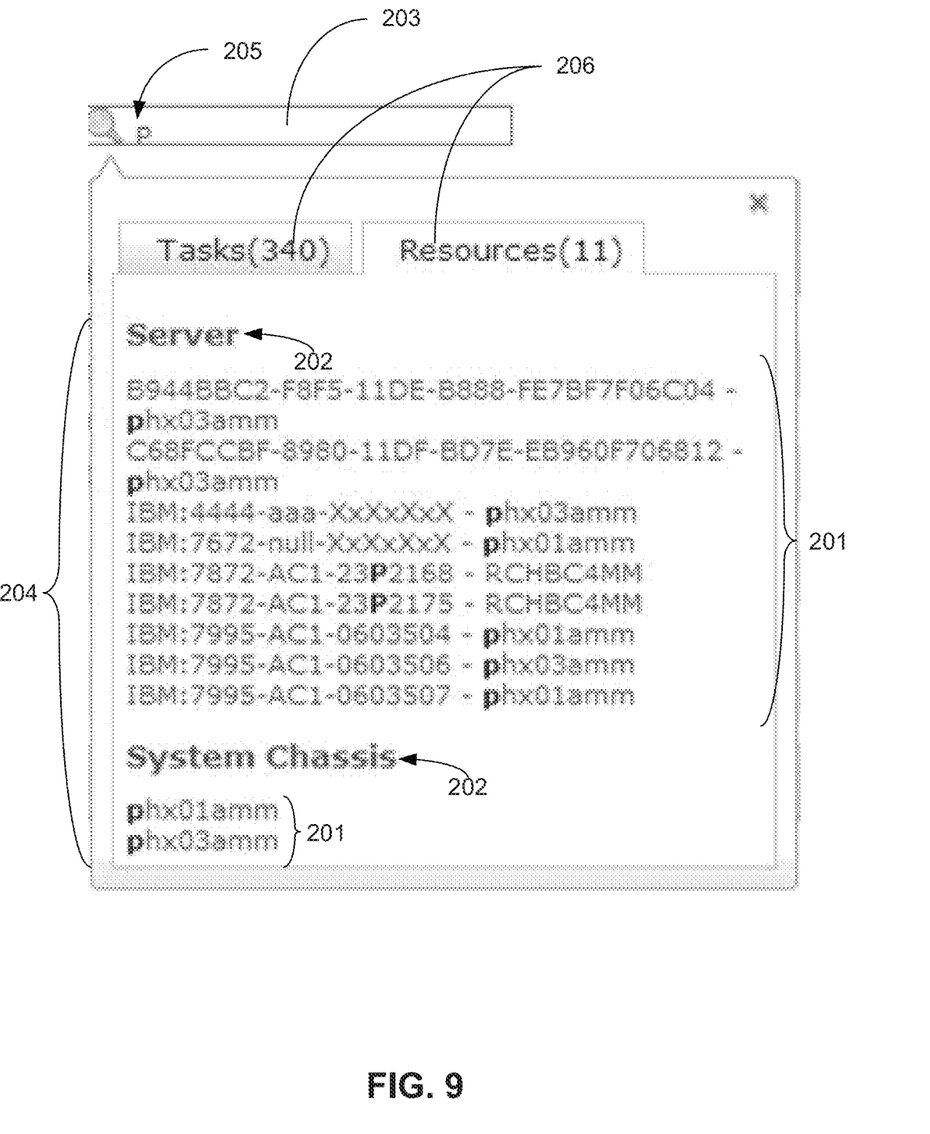
FIG. 9 shows a search string entered into a search bar and resulting ephemeral search results.
Figure 10:
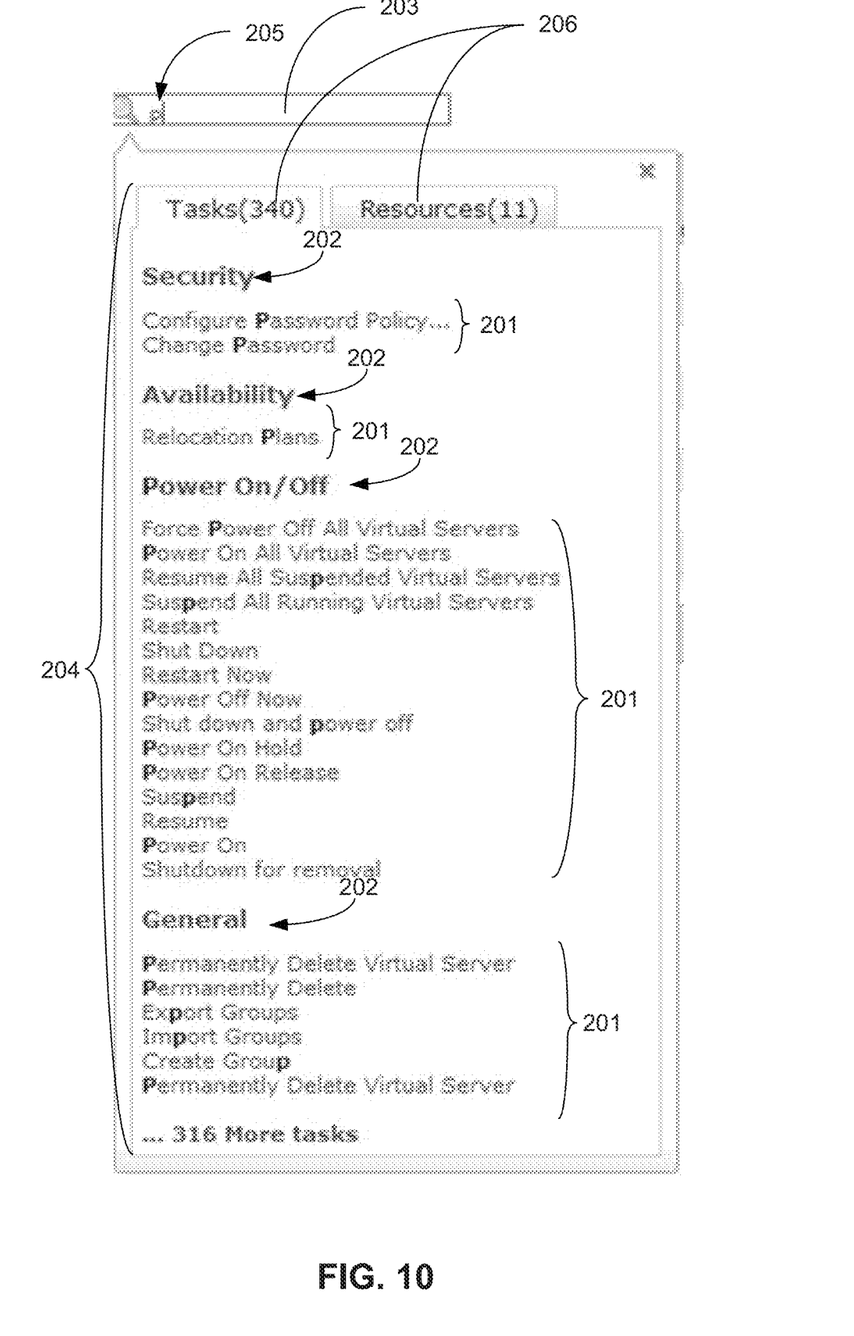
FIG. 10 shows a search string entered into a search bar and resulting ephemeral search results.
Figure 11:
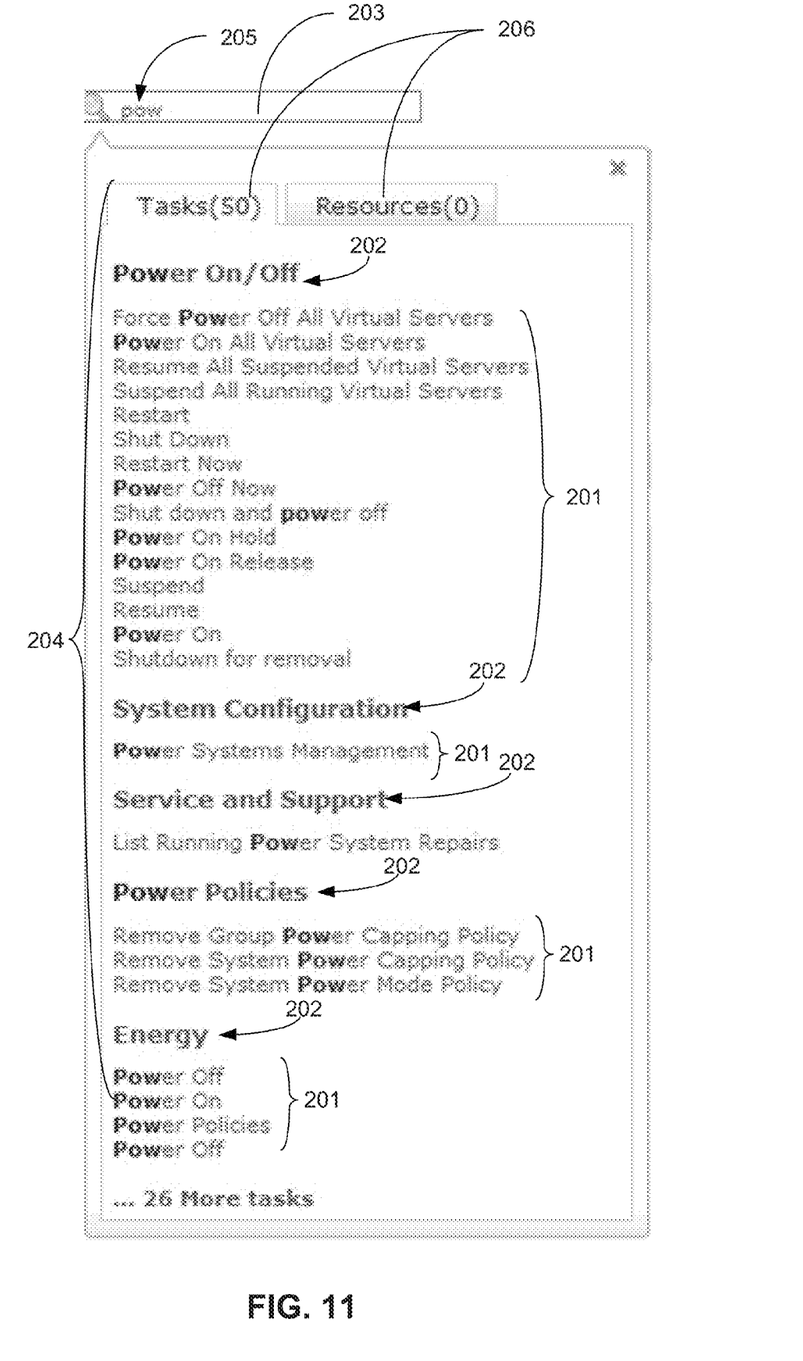
FIG. 11 shows a search string entered into a search bar and resulting ephemeral search results.

FIGS. 9-11 show an example where the user may be searching for power on/off related tasks. Referring to FIG. 9, the user has entered "p" as a search string 205 and "Resources" is the selected tab group 206. The records 201 that match search criteria may be displayed. As shown in FIG. 10, the user may then select the tab group 206 "Tasks". The records 201 that match the new search criteria may be displayed. As shown in FIG. 11, the user may refine search string 205 to "pow". The records 201 that match the narrowed search criteria may be displayed.

Figure 12A:
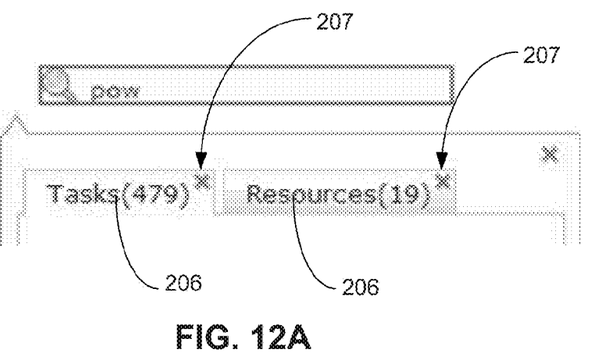
FIG. 12A shows searchable records divided between tabs.

FIG. 12A shows further features of the current invention. Tabs that correspond to tab groups 206 may include close tab buttons 207 as shown in FIG. 12A. All category groups 202 may be divided among tab groups 206. Clicking a close tab button 207 may cause the corresponding tab to be removed from the search result list 204. The category groups 202 may then be divided among a smaller number of tab groups 206. For example in FIG. 12A, if either the "Tasks" or "Resources" tab group 206 tab is closed, a new tab group 206 "Tasks and Resources" may be created and tab groups 206 "Tasks" and "Resources" may be deleted. All category groups 202 that were members of the "Tasks" or "Resources" tab groups 206 may then become members of the newly created "Tasks and Resources" tab group 206, as shown in FIG. 12B.

Figure 12B:
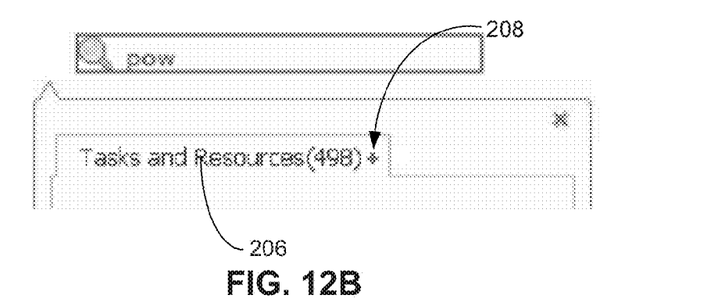
FIG. 12B shows searchable records displayed under one tab.

FIG. 12B shows further features of the current invention. A tab that corresponds to a tab group 206 may include an open new tab button 208 as shown in FIG. 12B. Clicking an open new tab button 208 may cause a new tab to be created. The new tab may correspond with a new tab group 206. For example in FIG. 12B, when the open new tab button 208 is clicked by a user, the tab group 206 "Tasks and Resources" is deleted and two new tab groups 206 "Tasks" and "Resources" are created as shown in FIG. 12C.

Figure 12C:
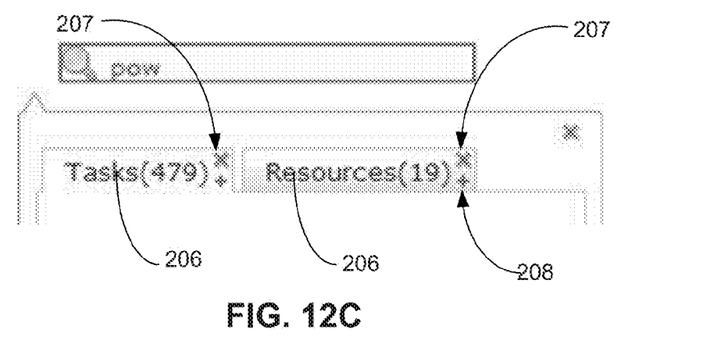
FIG. 12C shows searchable records divided between tabs.
Figure 12D:
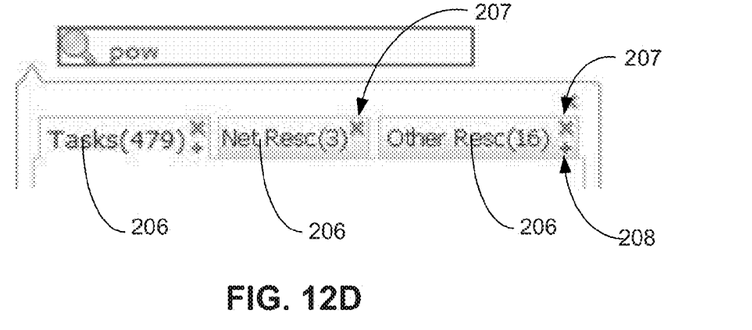
FIG. 12D shows searchable records divided between tabs.

FIG. 12C shows further features of the current invention. A tab that corresponds with a tab group 206 may include a close tab button 207 and an open new tab button 208 as shown in FIG. 12C. Similar to the previous example, if a user were to click either of the close tab buttons 207, a new tab group 206 "Tasks and Resources" may be created and tab groups 206 "Tasks" and "Resources" may be deleted. All category groups 202 that were members of the "Tasks" or "Resources" tab groups 206 may then become members of the newly created "Tasks and Resources" tab group 206, as shown in FIG. 12B. If a user clicks the open new tab button 208 associated with one of the tab groups 206, that tab group 206 may be divided into two new tab groups 206. For example, when a user clicks the open new tab button 208 corresponding with tab group 206 "Resources", tab group 206 "Resources" may be deleted and replaced with two tab groups 206 named "Net Resc" and "Other Resc", as shown in FIG. 12D. Further, a user could may be presented a list of options for the subdivision of the existing tab. For example, such options may include Storage resources, Network resources, Server resources, etc. Still further, such subdivisions may be related to other criteria (e.g. resource ownership).

FIG. 12D shows further features of the invention. The tab group 206 "Net Resc" may be incapable of being further divided because there may not be any tab group 206 that is a recognized subset of "Net Resc". Therefore, the tab corresponding to tab group 206 "Net Resc" may not include an open new tab button 208. The tab groups 206 "Other Resc" and "Tasks" may both be capable of further division, therefore tabs corresponding to these tab groups 206 may include open tab buttons 208. Clicking on the close tab button 207 corresponding with tab group 206 "Net Resc" or "Other Resc" may cause both tab groups 206 to be deleted and replaced with the tab group 206 "Resources" as seen in FIG. 12C. Clicking on the close tab button 207 corresponding with tab group 206 "Tasks" (i.e. an instance of a higher-level tab group 206 relative to the lower-level tab groups 206 "Net Resc", and "Other Resc") may cause tab groups 206 "Tasks", "Net Resc", and "Other Resc" to be deleted and replaced with tab group 206 "Tasks and Resources" as shown in FIG. 12B.

In another environment, it may be possible for some records 201 to be members of more than one category group 202. It may also be possible for some category groups 202 to be members of more than one tab group 206. A user may have the capability to create and delete custom tab groups 206 and their corresponding tabs without regard to whether a particular record 201 may be a member of multiple tab groups 206. A user may be able to create tabs corresponding to customizable tab groups 206. The tabs corresponding to such user defined tab group 206 may be created, opened or closed without regard to their hierarchical dependence or relation to other tab groups 206. User defined tab groups 206 may be created or deleted without regard to their hierarchical dependence or relation to other tab groups 206.

Figure 13A:
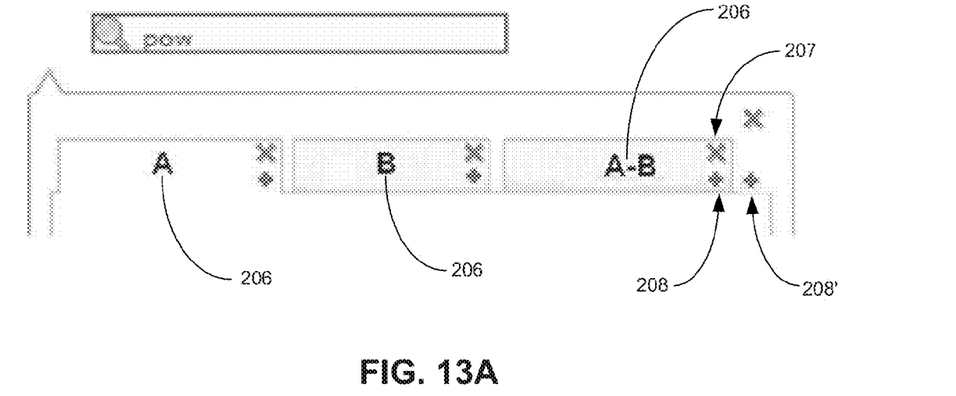
FIGS. 13A-13C show user customizable tab groups and tabs.

Accordingly as shown in FIG. 13A, a user may configure tab groups 206 to view records 201 that are members of a first category group 202 as a first tab group 206 "A" and records 201 that are a members of a second category group 202 as a second tab group 206 "B." Further, a user may wish to display records 201 which members of the first category group 202 (e.g. are displayed by tab group 206 "A") but not records 201 which members of the second category group 202 (e.g. are displayed by tab group 206 "B"). A user may create a tab group 206 "A-B" that will show records 201 that belong to the first category group 202 but not the second category group 202. Search results may be further refined by a user entered search string 205.

Figure 13B:
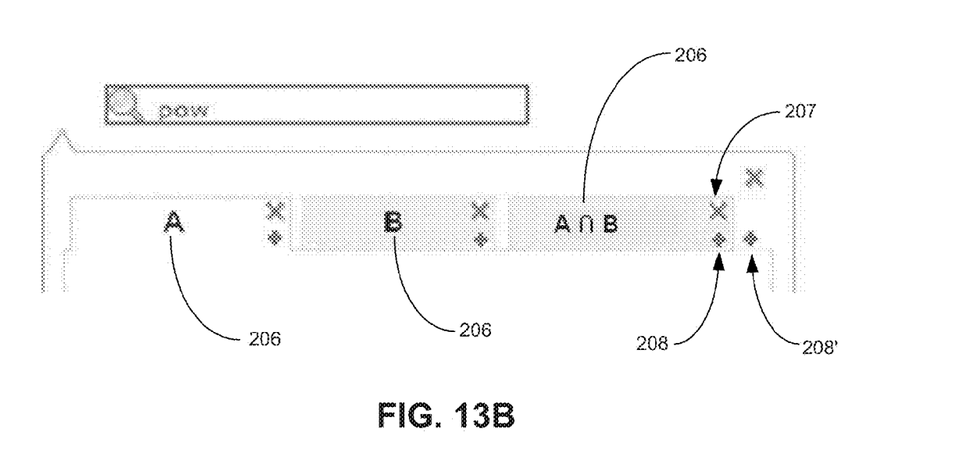

As shown in FIG. 13B, a user may configure tab groups 206 to view records 201 that are members of a first category group 202 as a first tab group 206 "A" and records 201 that are a members of a second category group 202 as a second tab group 206 "B." Further, a user may also want to view records 201 that are a member of a first category group 202 (e.g. are displayed by tab group 206 "A") and a member of a second category group 202 (e.g. are displayed by tab group 206 "B"). A user may create a tab group 206 "A∩B" that will show records 201 that belong to both the first category group 202 and the second category group 202B. Search results may be further refined by a user entered search string 205.

Figure 13C:
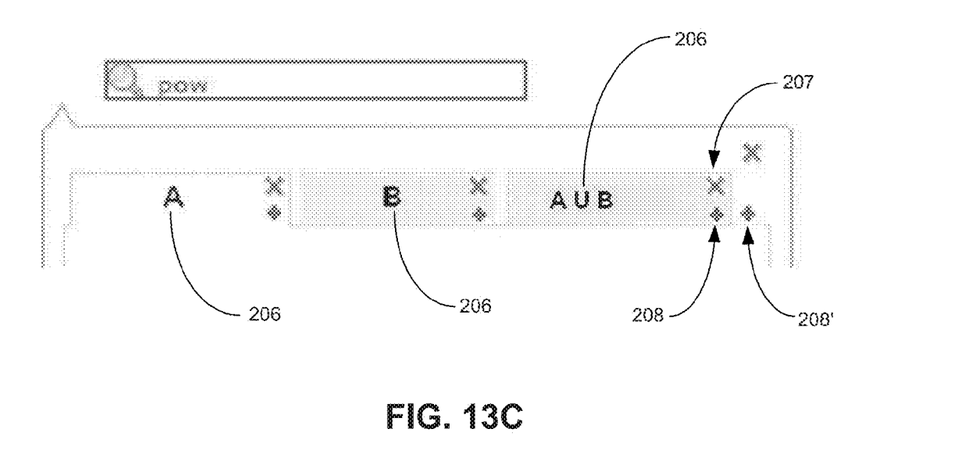

As shown in FIG. 13C, a user may configure tab groups 206 to view records 201 that are members of a first category group 202 as a first tab group 206 "A" and records 201 that are a members of a second category group 202 as a second tab group 206 "B." A user may also want to view records 201 that are members of a first category group 202 (e.g. are displayed by tab group 206 "A") or a member of a second category group 202 (e.g. are displayed by tab group 206 "B"). A user may create a tab group 206 "A U B" that will show records 201 that belong to the first category group 202 or the second category group 202B. Search results may be further refined by a search string 205.

As shown in FIGS. 13A-13C, an open new tab button 208 may be included as part of a tab corresponding to a tab group 206 or an open new tab button 208' may be located in the search result list 204 but be unassociated with any tab or tab group 206. Clicking an open new tab button 208 that appears on a tab may cause the tab group 206 that is associated with that tab to be divided into two new tab groups 206. Clicking an open new tab button 208' that is unassociated with a tab group 206 may cause a new tab group 206 to be created without deleting an existing tab group 206. Clicking a close tab button 207 may delete the corresponding tab group 206. Clicking a close tab button 207 may or may not cause one or more tab groups 206 to be combined.

It is believed that the present invention and many of its attendant advantages will be understood by the foregoing description. It may be also believed that it will be apparent that various changes may be made in the form, construction and arrangement of the components thereof without departing from the scope and spirit of the invention or without sacrificing all of its material advantages. The form herein before described being merely an explanatory embodiment thereof. It may be the intention of the following claims to encompass and include such changes.

The foregoing detailed description may include set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein may be capable of being distributed as a program product in a variety of forms, and that an illustrative embodiment of the subject matter described herein applies regardless of the particular type of signal bearing medium used to actually carry out the distribution. Examples of a signal bearing medium include, but may be not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

Those having skill in the art will recognize that the state of the art may include progressed to the point where there may be little distinction left between hardware, software, and/or firmware implementations of aspects of systems; the use of hardware, software, and/or firmware may be generally (but not always, in that in certain contexts the choice between hardware and software may become significant) a design choice representing cost vs. efficiency tradeoffs. Those having skill in the art will appreciate that there may be various vehicles by which processes and/or systems and/or other technologies described herein may be effected (e.g., hardware, software, and/or firmware), and that the preferred vehicle will vary with the context in which the processes and/or systems and/or other technologies may be deployed. For example, if an implementer determines that speed and accuracy may be paramount, the implementer may opt for a mainly hardware and/or firmware vehicle; alternatively, if flexibility may be paramount, the implementer may opt for a mainly software implementation; or, yet again alternatively, the implementer may opt for some combination of hardware, software, and/or firmware. Hence, there may be several possible vehicles by which the processes and/or devices and/or other technologies described herein may be effected, none of which may be inherently superior to the other in that any vehicle to be utilized may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically oriented hardware, software, and or firmware.

The invention claimed is:

1. A method for displaying search results comprising:
    displaying a first tab representing a first tab group including a first set of records from a combined tab group and a second tab representing a second tab group including a second set of records from the combined tab group in response to an input associated with closing a tab representing the combined tab group;
    displaying the tab representing the combined tab group including the first set of records from the first tab group and the second set of records from the second tab group in response to an input associated with closing the first tab representing the first tab group or the second tab representing the second tab group;
    receiving a selection associated with a tab group;
    receiving a search string;
    providing a refreshed display of one or more records according to the selection of the tab group and the search string whenever the selection associated with the tab group is changed by a user; and
    providing a refreshed display of one or more records according to the selection of the tab group and the search string each time a character is added or removed from the search string by the user.

2. The method of claim 1, wherein the receiving a selection associated with a tab group comprises:
    receiving a user input associated with a tab representing a tab group.

3. The method of claim 1, wherein the receiving a selection associated with a tab group comprises:
    receiving a selection associated with at least one of a resources tab group and a tasks tab group.

4. The method of claim 1, wherein the providing a refreshed display of one or more records according to the selection of the tab group and the search string further comprises:
    displaying a tab representing a selected tab group in the foreground of a search results window and displaying tabs associated with non-selected tab groups in the background of the search results window.

5. The method of claim 1, wherein the providing a refreshed display of one or more records according to the selection of the tab group and the search string comprises:
    displaying all records and category group titles that contain the search string and are associated with the selected tab group.

6. The method of claim 1, wherein the providing a refreshed display of one or more records according to the selection of the tab group and the search string further comprises:
    refreshing one or more records displayed in a search results window in response to receiving a second selection of one or more tab groups.

7. The method of claim 1, further comprising:
    receiving an input defining one or more tab groups.

8. The method of claim 7, wherein the receiving an input defining one or more tab groups comprises:
    receiving an input associated with dividing an existing tab group into one or more additional tab groups.

9. The method of claim 7, wherein the receiving an input defining one or more tab groups comprises:
    receiving an input associated with combining one or more existing tab groups into an additional tab group.

10. The method of claim 1, further comprising:
    receiving an input associated with assigning one or more records to one or more tab groups.

11. The method of claim 10, further comprising:
    receiving an input associated with defining one or more category groups, wherein the receiving an input associated with assigning one or more records to one or more tab groups comprises:
        receiving an input associated with assigning one or more records to one or more category groups; and
        receiving an input associated with assigning one or more category groups to one or more tab groups, and
    wherein the providing a refreshed display of one or more records according to the selection of the tab group and the search string comprises:
        displaying one or more records that contain the search string and are assigned to category groups that are assigned to the selected tab group; and
        displaying one or more records assigned to category groups that contain the search string and are assigned to the selected tab group.

12. The method of claim 11, wherein the providing a refreshed display of one or more records according to the selection of the tab group and the search string comprises:
    refreshing one or more records displayed in a search results window in response to receiving a second selection of one or more tab groups.

13. The method of claim 11, wherein the receiving an input defining one or more tab groups comprises:
    dividing an existing tab group into one or more additional tab groups.

14. The method of claim 11, wherein the receiving an input defining one or more tab groups comprises:
    combining one or more existing tab groups.

15. A system for displaying and sorting search results comprising:
    means for displaying a first tab representing a first tab group including a first set of records from a combined tab group and a second tab representing a second tab group including a second set of records from the combined tab group in response to an input associated with closing a tab representing the combined tab group;

means for displaying the tab representing the combined tab group including the first set of records from the first tab group and the second set of records from the second tab group in response to an input associated with closing the first tab representing the first tab group or the second tab representing the second tab group;

means for receiving a selection associated with a tab group;

means for receiving a search string;

means for providing a refreshed display of one or more records according to the selection of the tab group and the search string whenever the selection associated with the tab group is changed by a user; and means for providing a refreshed display of one or more records according to the selection of the tab group and the search string each time a character is added or removed from the search string by the user.

16. The system of claim 15, further comprising:

means for receiving an input associated with dividing an existing tab group into one or more additional tab groups.

17. The system of claim 15, further comprising:

means for receiving an input associated with combining one or more existing tab groups into an additional tab group.

18. A non-transitory computer-readable medium having computer-executable instructions for performing a method, the method comprising:

displaying a tab representing a combined tab group including a first set of records from a first tab group and a second set of records from a second tab group in response to an input associated with closing a first tab representing the first tab group or a second tab representing the second tab group;

receiving a selection associated with a tab group;

receiving a search string;

providing a refreshed display of one or more records according to the selection of the tab group and the search string whenever the selection associated with the tab group is changed by a user; and providing a refreshed display of one or more records according to the selection of the tab group and the search string each time a character is added or removed from the search string by the user.

19. The non-transitory computer-readable medium of claim 18, wherein the method further comprises:

receiving an input associated with dividing an existing tab group into one or more additional tab groups.

20. The non-transitory computer-readable medium of claim 18, wherein the method further comprises:

receiving an input associated with combining one or more existing tab groups into an additional tab group.

\* \* \* \* \*